J. Thompson,
Making Wooden Screws,
Nº 2,198.   Patented July 29, 1841.
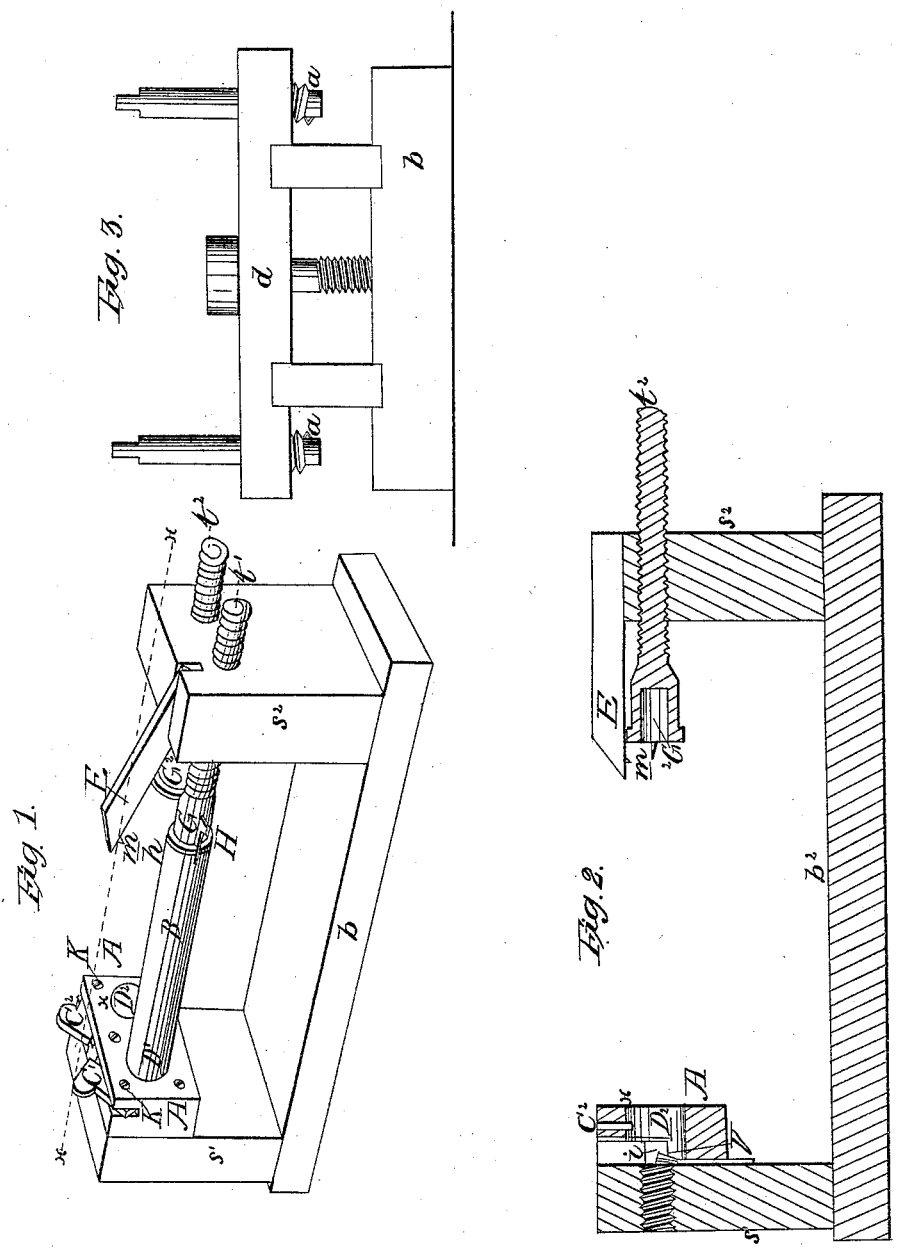

UNITED STATES PATENT OFFICE.

JOEL THOMPSON, OF CYNTHIANA, KENTUCKY.

MACHINE FOR CUTTING SCREWS ON THE RAILS OF BEDSTEADS.

Specification of Letters Patent No. 2,198, dated July 29, 1841.

*To all whom it may concern:*

Be it known that I, JOEL THOMPSON, of Cynthiana, in the county of Harrison and State of Kentucky, have invented a new and useful Improvement in Machines for Making Screws on the Ends of the Rails of Wooden Bedsteads, which is described as follows, reference being had to the annexed drawings of the same, making part of this specification.

This machine generally resembles other machines in use for making the screws on the rails of bedsteads by means of a V shaped cutter fixed to a standard of a bench $b'$ and turning the rail against said V cutters. Or by means of a V cutter placed in a nut which is turned by hand while the rail remains stationary, and in boring the female screw in the post by an auger $a$, Figure 3, the post being clamped firmly upon the bench $b^2$ by a clamp $d$. These machines for want of certain guides, gages, stops, slides, and other fixtures, which I supply, were rendered useless principally on account of the incompleteness and inaccuracy of the work produced by them which prevented the parts of the bedstead from being put together accurately after the screws were cut.

In the machine, as improved by me, the use and arrangement of certain guides, gages, mitered slides, keys, clamps, &c., which I have added, has rendered it completely effective—leaving the work produced by it in such a state that the parts of the bedstead will all fit together and come up true, even, close, and firmly without any trimming or after work being necessary.

As I do not mean to claim as new the benches $b'$, $b^2$ standards $s'$ $s^2$ screws $t'$ $t^2$ and clamp $d$ and socket $a'$ for holding the posts and rails while under the operation of having the screws cut it will not be required to have them more particularly described than is done in the drawings which will show the relative position of the several parts and enable me to show the application of my improvements.

Fig. 1 is a perspective view of the machine for cutting the screws on rails. Fig. 2 is a vertical section at the line $x$ $x$ of Fig. 1. Fig. 3 is a side elevation of the machine for making the screws in the posts.

Similar letters refer to corresponding parts.

First. I construct a stock A for receiving two hinged gages $c'$ $c^2$ by taking a block and making two round apertures or guide or steadying cavities $D'$ $D^2$ therein the diameter of the rail and on the same horizontal line and as far apart as the rails are to be placed when having the right and left screws cut; and I also make depressions or cavities $i$ in the inner face of said stock to admit the cutting iron V which iron is fastened to the standard $s'$ in the usual manner. And I also make vertical grooves to admit the hinged gages $c'$ $c^2$ which move vertically in said grooves on horizontal bolts $k$ passed through the stock A into the standard $s'$ and which also serve to hold the stock firmly to the said standard. The gages are represented in the drawings as raised in order to admit the shoulder of the rail B to pass farther into the guide opening $D'$ so as to bring the end of the tenon of the rail against the V. These gages are for the purpose of gaging the rail in marking it with a scribing iron $m$ which is fixed in the under side of a horizontal gage E so that the cutting of the thread of the right and left screw shall commence at the required place on the rail in order to make the threads correspond with the threads in the posts and thus make the parts come together accurately.

The center of the female screw or nut in the standard $s'$ $s^2$ and of the first mentioned apertures or guide holes D in the stock and of the socket $G'$ of the male screw $t'$ which hold the rail are all on a right line.

In setting the rail for the operation of having the screws cut it is first inserted into the apertures or guide hole $D'$ of the stock A with the shoulder firmly against the gage $c'$ previously brought down to a horizontal position in the grooves: then insert the other tenon of the rail into the socket $G'$ by bringing it up over the tenon and making it fast by a dog H or otherwise, so that it shall not turn; then by means of the horizontal sliding gage E moving longitudinally in a groove in the top of the standard $s^2$ a marker $p$ is made on the rail with the scribing iron $m$. The rail being thus properly adjusted and secured and the gages raised to the position represented in Fig. 1 the rail is turned by the hand of the operator which advances it to the cutting tool V by means of the male screw $t'$ of the socket $G'$ turning in the nut or female screw in the standard $s^2$ and this operation causes the right hand screw to be cut on one tenon of the rail. Then to cut the left hand screw on the other tenon of the same rail which is done by a V cutter placed in the aperture $D^2$ the position of the rail must be reversed and the tenon inserted into the aperture $D^2$ bringing the mark $p$ on the rail B to coincide exactly with the mark $x$ on the stock A—the rail is secured in the socket $G^2$ the gage $c^2$ is raised and the rail turned as before described which will cause the left screw to be cut and exactly in the place required for a proper fitting together of the several parts of the bedstead.

The machine represented in Fig. 3 for cutting the female screws in the posts is made and operated in the usual manner.

The invention claimed and desired to be secured by Letters Patent consists in—

The arrangement of the stock A in combination with the guide apertures $D'$ $D^2$ made of sufficient capacity to receive the body of the rail and the gages $c'$ $c^2$ in said stock in the standard $s'$ for determining the true position of the rail in cutting the right and left screws thereon as herein set forth.

JOEL THOMPSON.

Witnesses:
  WM. P. ELLIOT,
  E. MAHER.